United States Patent
Olesen (10) Patent No.: US 9,014,863 B2
(45) Date of Patent: *Apr. 21, 2015

(54) ROTOR BLADE CONTROL BASED ON DETECTING TURBULENCE

(75) Inventor: Ib Olesen, Aarhus N (DK)

(73) Assignee: Vestas Wind Systems A/S, Aarhus N (DK)

(*) Notice: Subject to any disclaimer, the term of this patent is extended or adjusted under 35 U.S.C. 154(b) by 445 days.

This patent is subject to a terminal disclaimer.

(21) Appl. No.: 13/388,391

(22) PCT Filed: Aug. 6, 2010

(86) PCT No.: PCT/EP2010/004969
§ 371 (c)(1),
(2), (4) Date: Feb. 1, 2012

(87) PCT Pub. No.: WO2011/015383
PCT Pub. Date: Feb. 10, 2011

(65) Prior Publication Data
US 2012/0165996 A1    Jun. 28, 2012

Related U.S. Application Data

(60) Provisional application No. 61/231,858, filed on Aug. 6, 2009.

(30) Foreign Application Priority Data

Aug. 6, 2009 (GB) .................... 0913739.9

(51) Int. Cl.
G05D 7/00 (2006.01)
B63H 3/00 (2006.01)
F03D 7/02 (2006.01)

(52) U.S. Cl.
CPC ............... *F03D 7/02* (2013.01); *F03D 7/0224* (2013.01); *F05B 2260/80* (2013.01); *F05B 2270/1033* (2013.01); *F05B 2270/804* (2013.01); *Y02E 10/723* (2013.01)

(58) Field of Classification Search
CPC ..................................... F03D 7/02
USPC ......................................... 700/282
See application file for complete search history.

(56) References Cited

U.S. PATENT DOCUMENTS 4,195,931 A * 4/1980 Hara ............................ 356/454
4,387,993 A     6/1983 Adrian (Continued)

FOREIGN PATENT DOCUMENTS

DE    31 06 624    9/1982
DE    31 48 867    6/1983

(Continued)

OTHER PUBLICATIONS

James Paddock; Combined Search and Examination Report issued in priority Great Britain Application No. GB0913739.9; Nov. 30, 2009; 7 pages; Great Britain Intellectual Property Office.

(Continued)

*Primary Examiner* — Mohammad Ali
*Assistant Examiner* — Yuhui R Pan
(74) *Attorney, Agent, or Firm* — Patterson & Sheridan, LLP (57) ABSTRACT

A control system may be used for rotor blade control. The control system comprises a number of turbulence sensors provided across the surface of a wind turbine blade. The control system monitors the turbulence sensors and when turbulent airflow is detected controls an aerodynamic parameter of the blades. In one embodiment, the parameter is the pitch of the rotor blades. This means that stall-like blade conditions can be avoided, and power generation from the wind turbine can be optimized. The control system may also use measurements of output power to be considered in combination with the turbulence based measurements to add a higher level of responsiveness and precise control.

26 Claims, 5 Drawing Sheets

(56) References Cited

U.S. PATENT DOCUMENTS

| | | |
|---|---|---|
| 4,671,659 A | 6/1987 | Rempt et al. |
| 4,681,025 A | 7/1987 | Carty |
| 4,912,530 A | 3/1990 | Bessho |
| 4,996,419 A | 2/1991 | Morey |
| 5,009,505 A | 4/1991 | Malvern |
| 5,094,527 A | 3/1992 | Martin |
| 5,160,976 A | 11/1992 | Carr et al. |
| 5,201,015 A | 4/1993 | von Bieren et al. |
| 5,250,802 A | 10/1993 | Runner |
| 5,275,053 A * | 1/1994 | Wlodarczyk et al. .......... 73/705 |
| 5,308,973 A | 5/1994 | Odoni et al. |
| 5,446,279 A * | 8/1995 | Hsu .......................... 250/227.21 |
| 5,488,475 A | 1/1996 | Friebele et al. |
| 5,633,748 A | 5/1997 | Perez et al. |
| 5,649,035 A | 7/1997 | Zimmerman et al. |
| 5,726,744 A | 3/1998 | Ferdinand et al. |
| 5,973,317 A | 10/1999 | Hay |
| 6,125,216 A | 9/2000 | Haran et al. |
| 6,301,968 B1 | 10/2001 | Maruyama et al. |
| 6,586,722 B1 | 7/2003 | Kenny et al. |
| 6,612,810 B1 | 9/2003 | Olsen et al. |
| 6,640,647 B1 | 11/2003 | Hong et al. |
| 6,850,821 B2 | 2/2005 | Weitkamp |
| 6,940,185 B2 | 9/2005 | Andersen et al. |
| 6,940,186 B2 | 9/2005 | Weitkamp |
| 7,059,822 B2 | 6/2006 | LeMieux et al. |
| 7,086,834 B2 | 8/2006 | LeMieux |
| 7,476,985 B2 | 1/2009 | Llorente Gonzalez |
| 7,703,331 B2 | 4/2010 | Magne et al. |
| 7,726,943 B2 | 6/2010 | Stommel |
| 7,908,923 B2 | 3/2011 | Bosselmann et al. |
| 8,002,523 B2 | 8/2011 | Borden |
| 8,123,480 B2 | 2/2012 | Enevoldsen et al. |
| 8,322,206 B2 | 12/2012 | Hucker et al. |
| 8,408,871 B2 | 4/2013 | Herr et al. |
| 8,463,085 B2 | 6/2013 | Cribbs |
| 8,712,703 B2 | 4/2014 | Olesen |
| 2002/0057436 A1 | 5/2002 | Skinner et al. |
| 2003/0066356 A1 | 4/2003 | Kanellopoulos et al. |
| 2003/0127587 A1 | 7/2003 | Udd et al. |
| 2003/0151259 A1* | 8/2003 | Feddersen et al. .............. 290/44 |
| 2004/0057828 A1 | 3/2004 | Bosche |
| 2004/0114850 A1 | 6/2004 | Dewyntermarty et al. |
| 2004/0201220 A1* | 10/2004 | Andersen et al. .............. 290/44 |
| 2004/0252290 A1 | 12/2004 | Ferguson et al. |
| 2005/0088660 A1 | 4/2005 | Ronnekleiv |
| 2005/0230606 A1* | 10/2005 | Vidovic et al. .......... 250/227.11 |
| 2005/0276696 A1 | 12/2005 | Lemieux |
| 2006/0000269 A1* | 1/2006 | LeMieux et al. .......... 73/170.01 |
| 2006/0146337 A1 | 7/2006 | Hartog |
| 2006/0285813 A1 | 12/2006 | Ferguson |
| 2007/0018457 A1* | 1/2007 | Llorente Gonzalez ......... 290/44 |
| 2007/0223004 A1 | 9/2007 | Baillon et al. |
| 2007/0280582 A1 | 12/2007 | Sanders |
| 2007/0284112 A1 | 12/2007 | Magne et al. |
| 2008/0013879 A1 | 1/2008 | Mossman |
| 2008/0317598 A1* | 12/2008 | Barbu et al. ........................ 416/9 |
| 2009/0097976 A1* | 4/2009 | Driver et al. ..................... 416/42 |
| 2009/0311096 A1* | 12/2009 | Herr et al. ........................ 416/42 |

FOREIGN PATENT DOCUMENTS

| | | |
|---|---|---|
| DE | 195 24 036 | 7/1996 |
| DE | 253669 | 1/1998 |
| DE | 199 23 087 | 12/2000 |
| DE | 199 27 015 | 12/2000 |
| DE | 202 06 704 | 8/2002 |
| DE | 101 60 522 | 6/2003 |
| DE | 103 15 676 | 11/2004 |
| EP | 0 640 824 | 3/1995 |
| EP | 0 857 291 | 5/1997 |
| EP | 0 984 243 | 3/2000 |
| EP | 1 148 324 | 10/2001 |
| EP | 1 249 692 | 10/2002 |
| EP | 1 359 321 | 11/2003 |
| EP | 1 466 827 | 10/2004 |
| EP | 1 586 854 | 10/2005 |
| EP | 1 770 278 | 4/2007 |
| EP | 1 780 523 | 5/2007 |
| EP | 1 873 395 | 1/2008 |
| EP | 1 911 968 | 4/2008 |
| EP | 2 025 929 | 2/2009 |
| EP | 2 075 462 | 7/2009 |
| FR | 2 707 754 | 1/1995 |
| GB | 2 105 846 | 3/1983 |
| GB | 2 284 256 | 5/1995 |
| GB | 2 326 471 | 12/1998 |
| GB | 2 398 841 | 9/2004 |
| GB | 2 409 517 | 6/2005 |
| GB | 2 421 075 | 6/2006 |
| GB | 2 428 748 | 2/2007 |
| GB | 2 440 953 | 2/2008 |
| GB | 2 440 954 | 2/2008 |
| GB | 2 440 955 | 2/2008 |
| GB | 2466433 | 6/2010 |
| JP | 55-69006 | 5/1980 |
| JP | 58-153107 | 9/1983 |
| JP | 60-100707 | 6/1985 |
| JP | 10-69922 | 3/1989 |
| JP | 6-117914 | 4/1994 |
| JP | 2000-111319 | 4/2000 |
| JP | 2003-302536 | 10/2003 |
| JP | 2007-114072 | 5/2007 |
| LV | 11378 | 8/1996 |
| LV | 11389 | 8/1996 |
| RU | 780 654 | 3/1996 |
| SU | 577394 | 10/1977 |
| WO | 97/15805 | 5/1997 |
| WO | 0023764 | 4/2000 |
| WO | 00/28294 | 5/2000 |
| WO | 00/39548 | 7/2000 |
| WO | 01/33075 | 5/2001 |
| WO | 02/053910 | 7/2002 |
| WO | 03/076887 | 9/2003 |
| WO | 2005/024349 | 3/2005 |
| WO | 2005/071382 | 8/2005 |
| WO | 2005/071383 | 8/2005 |
| WO | 2006/021751 | 3/2006 |
| WO | 2006/063990 | 6/2006 |
| WO | 2007/099290 | 9/2007 |
| WO | 2007/104306 | 9/2007 |
| WO | 2008/101496 | 8/2008 |
| WO | 2009/046717 | 4/2009 |

OTHER PUBLICATIONS

Pavlos Avramidis; International Search Report and Written Opinion issued in priority International Application No. PCT/EP2010/004969; May 18, 2011; 10 pages; European Patent Office.

Gareth John; Search Report issued in Great Britain Application No. GB0812037.0; Sep. 16, 2008; 4 pages; Great Britain Intellectual Property Office.

P. Ganci; International Search Report issued in International Application No. PCT/GB96/02606; Jan. 28, 1997; 2 pages; European Patent Office.

Robert MacDonald; Combined Search and Examination Report issued in Great Britain Application No. GB0812258.2; Nov. 7, 2008; 6 pages; Great Britain Intellectual Property Office.

Christopher Smith; Search Report issued in Great Britain Application No. GB0814651.6; Dec. 4, 2008; 1 page; Great Britain Intellectual Property Office.

Tony Oldershaw; Examination Report issued in Great Britain Application No. GB0814651.6; May 1, 2009; 2 pages; Great Britain Intellectual Property Office.

Tony Oldershaw; Combined Search and Examination Report issued in Great Britain Application No. GB0817341.1; Jan. 12, 2009; 4 pages; Great Britain Intellectual Property Office.

David Biloen; International Search Report and Written Opinion issued in International Application No. PCT/IB2009/007018; Oct. 7, 2010; 6 pages; European Patent Office.

(56) References Cited

OTHER PUBLICATIONS

Lars Jakobsson; International Search Report issued in International Application No. PCT/N003/00087; Jun. 10, 2003; 3 pages; European Patent Office.

James Paddock; Combined Search and Examination Report issued in Great Britain Application No. GB0913739.9; Nov. 30, 2009; 4 pages; Great Britain Intellectual Property Office.

Daniel Jones; Combined Search and Examination Report issued in Great Britain Application No. GB1004162.2; Sep. 13, 2010; 8 pages; Great Britain Intellectual Property Office.

Mike Walker; Combined Search and Examination Report issued in Great Britain Application No. GB1001855.4; Mar. 22, 2010; 7 pages; Great Britain Intellectual Property Office.

Tony Oldershaw; Combined Search and Examination Report issued in priority Great Britain Application No. GB0822930.4; Mar. 26, 2009; 6 pages; Intellectual Property Office.

Christoph Felicetti; International Search Report and Written Opinion issued in priority International Application No. PCT/EP2009/008934; Apr. 27, 2010; 11 pages; European Patent Office.

David Biloen; International Preliminary Report on Patentability issued in International Application No. PCT/IB2009/007018; Mar. 7, 2011; 9 pages; European Patent Office.

Jonathan Charles Teixeira Moffat; Office Action issued in U.S. Appl. No. 13/119,871; Jun. 30, 2011; 23 pages; U.S. Patent and Trademark Office.

Jonathan Charles Teixeira Moffat; Office Action issued in U.S. Appl. No. 13/119,871; Dec. 13, 2011; 18 pages; U.S. Patent and Trademark Office.

\* cited by examiner

○ Laminar
✕ Turbulent

FIG. 10

ROTOR BLADE CONTROL BASED ON DETECTING TURBULENCE

CROSS-REFERENCE TO RELATED APPLICATIONS

This application claims the benefit of PCT International Application No. PCT/EP2010/004969 entitled "Rotor Blade Control Based On Detecting Turbulence" and filed on Aug. 6, 2010 and further claims the benefit of U.S. Provisional Application Ser. No. 61/231,858 entitled "Rotor Blade Control Based On Detecting Turbulence" and filed Aug. 6, 2009, and claims priority to Great Britain Patent Application No. 0913739.9 entitled "Rotor Blade Control Based On Detecting Turbulence" and filed Aug. 6, 2009.

The present invention relates to a rotor blade control system for a wind turbine, and in particular a blade control system that controls an aerodynamic parameter of the blade, such as pitch angle, based on a measurement of turbulence.

Figure 1:
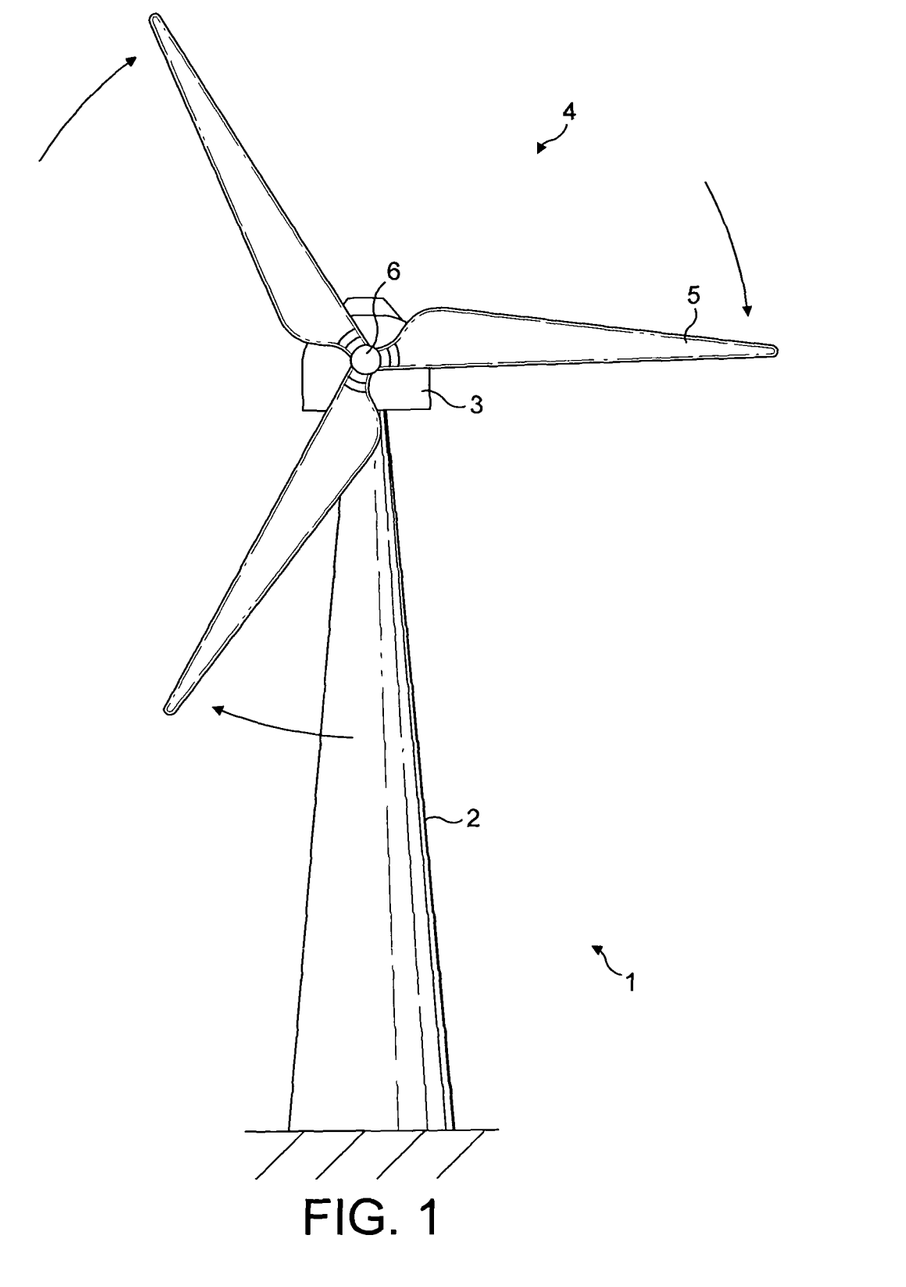
FIG. 1 illustrates a wind turbine.

FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm for example. In the latter case, the diameter of the rotor could be as large as 100 meters or more.

In wind turbine power generation, the power efficiency of the turbine is largely dependent on two factors, the pitch angle and the tip speed ratio. The pitch angle $\theta$ is the angle at which the rotor blade is orientated relative to the rotor plane, that is the direction in which the rotor blade is rotating. The orientation of the blade is assessed with respect to the blade chord which connects the leading and trailing edge. This is illustrated in more detail in FIG. 2.

Figure 2:
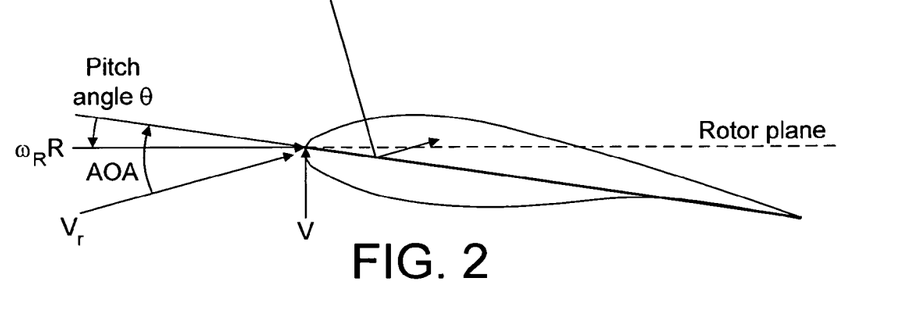
FIG. 2 is a schematic cross-section through a wind turbine rotor blade indicating useful terminology and principles.

The pitch angle is not the same as the Angle of Attack (AOA), which is the angle made between the direction of the incident wind on the blade, and the pitch angle. The incident wind is indicated by vector V, and a rotational component as the blade moves through the air indicated by vector $w_R R$. This results in a relative wind direction of $V_r$. The lift L provided by the blade is at right angles to the relative wind direction $V_r$.

The operation of a wind turbine can broadly be classified as either partial load or full load. In partial load operation, the blades of the wind turbine are rotating and power is being produced, but due to low wind speeds the power generated is below the maximum possible or rated power value for the turbine. In such cases, it is desirable to maximise the power that can be extracted by angling the wind turbine fully into the wind, and for pitch controlled wind turbines by changing the pitch angle of the blades to maximise the lift on the blade. For full load operation, or at wind speeds that are too high, the wind turbine has to be carefully controlled so that damage to the wind turbine is avoided.

In non-pitch stall controlled wind turbines, the blades are connected to the rotor hub at a fixed angle, but are aerodynamically shaped so that when the incident wind speed is in excess of a predetermined value turbulence is created on the leeward side of the blade. The turbulence results in the lift experienced by the blade, and consequently the generated power, being limited to a range dependent on the aerodynamic shape chosen.

For pitch controlled wind turbines, at wind speeds that are within the range of safe operating speeds for power generation, the way in which the blades are pitched is largely the same for all designs, namely they are pitched into the wind as much as possible in order to extract the maximum energy from the incident wind. If the blades are pitched too much, however, then they will cause a stall in the flow of wind around the blades. This principle is used in active stall control wind turbines to protect the generator from overloads caused by excessive wind speeds. However, during normal operation a stall condition is undesirable as it means that the wind turbine is not operating efficiently.

In full load operation, the wind turbine blades are rotating and power is being produced, but the power generated is now at a maximum and there is a danger of overloading the generator or on the grid. In such cases, the blades or the turbine itself can be angled with respect to the wind to reduce the tip speed and reduce the generated power. In pitch controlled wind turbines for example, the blades may be deliberately under-pitched, by angling them out of the wind in order to reduce the power extracted and avoid overloading the generator. In active stall wind turbines, the blades are actively pitched further into the wind, and are overpitched to such an extent that stall-like conditions are deliberately introduced to reduce the power extracted from the wind. In effect, the efficiency is tailored to meet the maximum rated power.

There is therefore a need for a control to ensure that blades respond to quickly to changes in wind speed and direction to maintain the optimal pitch and avoid undesirable stall conditions. This is particularly important at low wind speeds, say between 3 m/s and 15 m/s where the turbine is operating in partial load conditions below its maximum rated power, and extracting the maximum power available from the wind is therefore crucial. Further, the general efficiency and operation of a wind turbine blade is highly dependent on the quality of the airflow over the leeward or suction side of the blade. It would be desirable to be able to monitor this more closely for operation, maintenance and control considerations.

SUMMARY OF THE INVENTION

According to a preferred embodiment of the invention, a wind turbine rotor blade control system is provided that comprises: a plurality of sensors for detecting turbulent air flow across a rotor blade surface; a controller for receiving data from the plurality of sensors, and based on the detection of turbulent air flow controlling an aerodynamic parameter of the rotor blade. Each of the plurality of sensors comprises: a sensor membrane for detecting the turbulence of air flow past a surface of the wind turbine blade, and wherein the sensor membrane is integral to the surface, and covers at least part of a cavity in the wind turbine blade; a light source located in the cavity for illuminating the surface of the sensor membrane inside the cavity; a light detector located in the cavity for detecting light reflected from the surface of the membrane, and for providing an output to a processor, the processor determining from the output a turbulence value for the air flow across the sensor membrane.

The invention therefore allows the aerodynamic interaction of the blade with the air flow to be monitored in real time, and adjusted as desired based on a measure of turbulence.

The invention provides a sensitive sensor system due to the fact that small displacements of the sensor membrane can be detected using the light source and detector. Further, the sensor is relatively easy to install and can be situated in the wind turbine blade for protection, and to ensure that the presence of the sensor does not interfere with the measurement. As there are few moving parts, the sensor is resistant to extreme changes of temperature.

In one embodiment, the aerodynamic parameter is the pitch angle of the rotor blade. This offers a responsive and finely tuned rotor blade pitch control mechanism based both on the immediate aerodynamic conditions of the rotor blade. If the blade angle is too great, the turbulence sensors detect the resulting stall condition and the pitch controller reduces the pitch. This leads to improved electricity generation regime.

Advantageously, the control system comprises a power sensor for detecting the output power of the wind turbine and outputting a signal to the pitch controller, wherein the pitch controller additionally controls the pitch of the rotor blades based on the detection of wind turbine output power. The combination of two control signals means that output power control can be used to give a coarse grained control over the blade pitch, and the turbulence sensors used to provide a fine grained control. The pitch controller preferably controls the pitch of the rotor blades to minimise the turbulence, and maximise the wind turbine output power.

To detect stall-like conditions, the plurality of sensors are advantageously located on the suction surface of the blade, and even more advantageously are located in greater numbers towards the trailing edge of the suction side of the blade, than in other areas.

Preferably, the controller reduces the pitch of the rotor blade into the wind, when a predetermined number of sensors indicate turbulent air flow.

In alternative embodiments, the aerodynamic parameter is the shape of the rotor blade, or is the air flow past the blade. Provision of suitable mechanisms to change the blade shape or adjust the flow of air past the blade can then be operated based on the sensor output to ensure that, to the extent possible, operating conditions are maintained according to preset desired values or ranges.

In one embodiment, the light source and light detector in the cavity are optical fibres connected to an opto-electrical light source. This allows the use of electrical components in the sensor to be avoided, and means that the sensor will be resistant to lighting strikes. These are especially common for wind turbine blades. Any electrical components for the sensor can be housed in part of the wind turbine that is electrically shielded.

Preferably, the sensor comprises an adder for adding light reflected from the surface of the membrane to a reference light signal to give an interference pattern that indicates displacement of the membrane. Use of an interference pattern provides the most accurate way of interpreting the displacement of the membrane, as small displacements of the membrane can be used to give large variations in intensity. For larger displacements, a sinusoidal intensity pattern is produced, meaning that information about the speed at which the displacement is occurring as well as the direction of displacement can be obtained from analysis of the sinusoidal frequency and rate of occurrence.

In one embodiment, the adder comprises a partial mirror located in the sensor cavity to reflect a portion of the light from the light source to the light detector and provide the reference light signal. Thus, all of the components of the sensor are provided locally inside the cavity for ease of replacement and maintenance.

In a further embodiment, the sensor cavity is sealed. This allows the cavity environment to be maintained at levels of humidity and temperature that ensure good operation of the sensor membrane. Furthermore, the cavity may be filled with a gas other than air, such as an inert gas.

In one embodiment, the sensor membrane may be formed of a different material to that from which the surface of the wind turbine component is formed. This allows it to be tailored more precisely to its function as a sensor, in terms of tension and responsiveness. Depending on installation, the sensor membrane may alternatively be formed by the blade surface itself.

In one embodiment, the turbulence sensor comprises a processor for analysing the sinusoidal variations in the interference pattern over a predetermined period of time to determine whether the air flow is turbulent. The processor may analyse the pattern using pattern recognition or statistical techniques and give a determination with an associated level of confidence. Analysis for a longer period of time may give a higher degree of confidence in the sensor outcome.

In a further embodiment, the control system comprises a memory for storing data from the plurality of sensors and generating a log of air flow conditions over the surface of the wind turbine blade. This allows the real time performance of the rotor blade to be monitored and recorded for the purposes of blade design improvement.

A corresponding method and computer program product are also provided.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENTS

Figure 3:
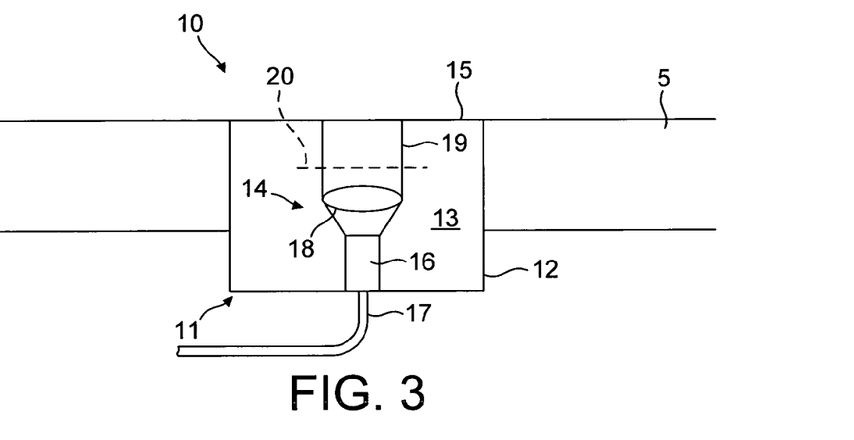
FIG. 3 illustrates a first example of a turbulence sensor according to the invention.

FIG. 3 illustrates a first example of a turbulence sensor according to a preferred embodiment of the invention. The turbulence sensor is shown in situ integrated into the blade of a wind turbine rotor, or other component.

The sensor 10 comprises a sensor housing 11, having side walls 12 that define a cavity 13. In the cavity 13, sensor apparatus, denoted generally by reference number 14, is situated. One surface of the sensor housing 11 is provided with a sensor membrane 15. In practice, the sensor 10 is mounted in the blade such that the sensor membrane 15 separates the cavity 13 from the outside air, and such that the membrane 15 is in contact with the air flow across the surface of the blade. The cavity is entirely sealed off from the external environment by the side walls 12 and the membrane 15, so that movement of the membrane surface can be considered wholly attributable to variations in the air flow across the blade surface. Sealing the cavity also acts to keep the internal surface of the membrane clean, and allows the internal environment of the cavity to be regulated to avoid build up of moisture that could affect the sensor membrane 15 and apparatus 14. The cavity 13 may for example be filled with an inert gas.

Preferably, the blade surface and the membrane 15 are arranged so that they form a smoothly continuous blade surface. It is undesirable both for the aerodynamic properties of the blade and for the sensitivity of the sensor if the connection between the membrane 15 and the blade surface is not continuous as this may introduce obstructions or impediments into the air flow.

The membrane 15 is arranged such that it is susceptible to changes in air flow at the surface of the wind turbine component. It is therefore relatively thin, in some embodiments between 0.5 and 2 mm, and is tensioned so that turbulent airflow will result in only a small movement of the membrane surface. An interference pattern is produced by shining light on to the membrane in order to measure the displacement of the membrane. In practice, therefore, a range of movement of the membrane of the order of several μm has been found advantageous, owing to the wavelength of the light used. The choice of the membrane material is critical to ensure it is suitable for measurement. A material that is too light and flexible will be too sensitive to changes in air flow even in laminar conditions will not be suitable for distinguishing turbulent and laminar flow. Preferably, the material is therefore strong and stiff enough to ensure that only strong vibrations (in the range of 10 to 100 Hz) from turbulent air flow give a sufficient interference signal.

It is possible to use the outside surface of the rotor blade itself as the membrane 15. In this case, the sensor apparatus 14 can be installed in the rotor blade under the outer surface, with or without the sensor housing 11 creating a sealed cavity for the apparatus. If the sensor 10 is installed into the rotor blade or other wind turbine component, as a separate unit, then a hole of diameter 30 to 100 mm has been found adequate to accommodate the sensor housing 11 and apparatus 14.

The internal construction of the sensor apparatus 14 will now be explained in more detail. Sensor apparatus 14 comprises a light source 16 aimed at the membrane 15. Where possible, it is advantageous to avoid the use of electrical components in rotor blades as they are more susceptible to damage from lighting strikes. Thus, the light source 16 preferably comprises an optical fibre 17 connected to an opto-electronic light source, such as a photo-diode or laser, located remotely in the rotor blade hub. In this embodiment the light source 16 constitutes the exposed end of the optical fibre 17 and a suitable mount to support the fibre in the sensor cavity and ensure that it is securely aimed at the membrane 15.

In FIG. 3, the light source 16 comprising the optical fibre 17 also acts as a receiver for light that is reflected back from the membrane 15. The light source 16 is therefore arranged perpendicularly to the membrane 15 so that at least some of the reflected light from the membrane will be incident on the open end of the optical fibre. The apparatus 14 optionally comprises one or more lenses 18 provided between the optical fibre 17 and the membrane 15. In this way, a beam of light 19 emitted from the fibre 17 may be focussed into a tighter beam incident on the membrane and the beam reflected back can be at least partially focussed on the end of the fibre 17.

The apparatus 14 may also comprise a partially reflecting mirror 20, located between the membrane and the optical fibre 17. In this way, the optical fibre will receive light reflected back from both the plane of the mirror 20 and also from the plane of the membrane 15. If one or more lenses 18 are installed, the partially reflecting mirror 20 may be advantageously located between the membrane 15 and the one or more lenses 18. The apparatus 14 may be secured inside cavity 13 by suitable connections to housing walls 12.

It will be appreciated that some internal reflection of the light in the optical fibre 17 will occur at the fibre to air interface in the fibre 17. As a result, even without the partial mirror 20, an interference pattern can be produced using solely the optical fibre 17 and the membrane surface 15. However, the amount of light subject to internal reflection is only around 4% of the total. While this is sufficient to produce a useful reference signal to interfere with the sensor signal from the membrane 15, in some embodiments it is useful to provide a stronger unreflected reference signal. As reflection from the partial mirror is around 40 to 50%, and the reflection from the membrane 15 a similar order of magnitude, the partial mirror provides a reference and sensor signal of similar magnitude. It also allows light sources that are not especially powerful to be used, thereby making the sensor cheaper to produce. In this case, the most significant interference occurs at the partial mirror, although as before, interference will still occur at the fibre to air interface.

Locating the partially reflecting mirror 20 in the sensor cavity 13 is advantageous, as it means that all of the components likely to require installation and maintenance are located together in same location of the component. Alternatively, the partially reflecting mirror may be omitted from cavity and located instead in the path of the optical fibre 17, as will be described below. This can be useful if it is desired to save space in the sensor cavity 13.

In the sensor described above with reference to FIG. 3, a single optical fibre 17 is used as to form a single light source and receiver sensor pair. The interference may occur in the cavity 13 as described above, either at the mirror or fibre interface, or even at a location away from the cavity, if the returned signal is interfered with a reference light signal.

Figure 4:
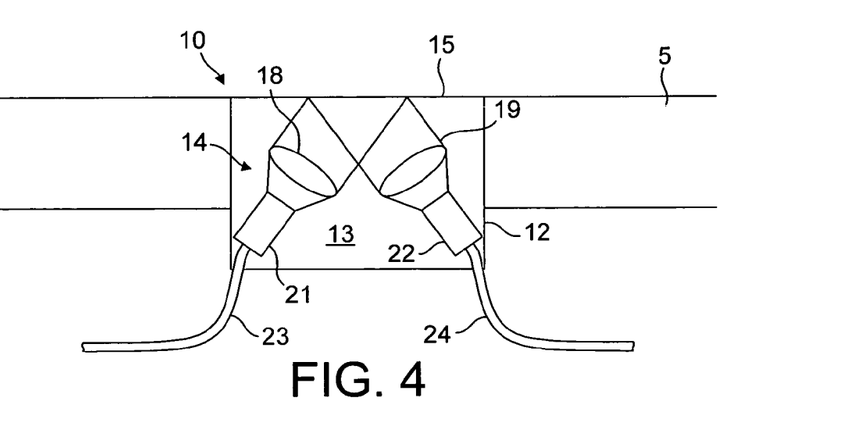
FIG. 4 illustrates a second example of a turbulence sensor according to the invention.

An alternative embodiment will now be described with reference to FIG. 4. In FIG. 4 the sensor apparatus 14 comprises a light source optical fibre 21 and 23 and a light receiving optical fibre 22 and 24. The optical fibres are typically angled so that the beam from one fibre 21, is reflected by the membrane 15, and is subsequently incident on the other fibre 22. As before, the light that is incident on the membrane 15 undergoes a change in path length as a result of movement of the membrane with respect to the sensor cavity. This light is then received by the other fibre 22 and is interfered with an unreflected, or reference portion of the light, in order to produce an interference pattern. In FIG. 4, the light is transmitted to and from the sensor cavity by means of the different optical fibres 23 and 24.

Other suitable arrangements of sensor could be implemented and will occur to the skilled person.

Figure 5:
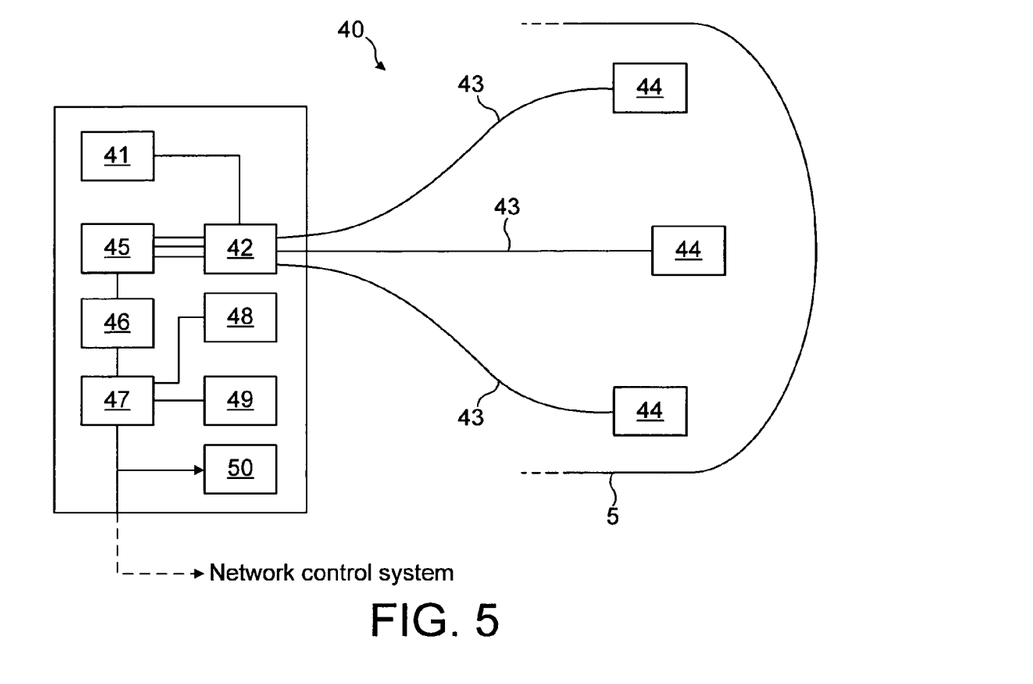
FIG. 5 illustrates an example sensor system incorporating sensors such as those shown in FIG. 3 or 4.

The turbulence sensors shown in FIG. 3 or 4 are part of a larger wind turbine sensing and control system 40 as shown in FIG. 5. The turbine sensing and control system 40 comprises one or more light sources 41, such as a laser or photo diodes, coupled to one or more optical mixers 42. The optical mixer for example can be used to provide mixing of the reflected signal light, and unreflected reference light in cases where the partial mirror 20 is not used in the sensor cavity.

Optical fibres 43 are connected between the one or more optical mixers 42 and respective turbulence sensors 44. The turbulence sensors 44 may for example be those illustrated in FIGS. 3 and 4 above, in which case fibres 43 correspond to fibres 17, 23 and 24 as shown in the figures. Additionally, the fibres 43 carry reflected light signals from the turbulence sensors back to the optical mixer 42.

As shown in FIG. 5, a plurality of sensors 44 are preferably distributed at a number of different locations across the leeward or windward surfaces of the wind turbine blades. The number of sensors per blade may be three or greater, per blade surface, for example. In this way, the air flow over of the blade surface can be accurately sensed and used to control of the blade pitch in real time. This will be explained in more detail below.

The optical mixer 42 is coupled to light sensing device 45. For each turbulence sensor, the light sensing device receives at least two light signals, the first being a light signal that has been reflected from the membrane 15, and the second being a signal that has been reflected, not by the membrane 15, but by the partially reflecting mirror 20, either in the sensor cavity 13 or into the optical path between the light source 41 and the light sensor 45. A suitable location is of course optical mixer 42, in which instead of a mirror, a portion of the light from the light source can simply be diverted directly to the light sensor 45.

The light sensor 45 is in turn connected to an Analogue to Digital Converter (ADC) 46 which is connected to a processor 47 for processing the results. Processor 47 preferably has access to a timer unit 48 and a memory 49. The processor 47 may also be connected to a turbine blade pitch controller 50.

Many wind turbines, especially those installed in wind parks, are monitored and controlled by sophisticated control systems, such as the SCADA Supervisory Control and Data Acquisition system. It will therefore be appreciated that in practice, processor 47 will typically be connected to a larger control system, and may have access to data or information gathered at the wind turbine other than that received from the turbulence sensor. This need not always be the case however, such as where turbines are installed as stand-alone individual units.

Preferably the light source 41, the light sensor 45, the ADC 46 and processor 47 are housed separately from the rotor blade, either in the rotor blade hub, or in the nacelle, where they may be protected from lighting strikes by a suitable arrangement of lighting conductors or electrical shielding.

It will be appreciated that the phase of the signal received from the partially reflecting mirror will be solely determined by the phase of the light source 41, and that it can therefore be used as a reference signal. The phase of the signal that has been reflected by the membrane will however vary according to the optical path length between the emitting and receiving optical fibres 17, 23 or 24 in the sensor cavity 13. In turn, this path length is affected by movement or vibration of the membrane 15 caused by the air flow past outer surface of the blade. Thus by allowing the two signals to interfere with one another and sensing changes in phase of the two signals, information can be generated about the quality of the air flow.

In ideal operating conditions, the air flow across the surface of the rotor blade will be laminar, resulting in little or no disturbance of the membrane 15. Turbulent air flow caused by the pitch of the blade inducing stall like conditions will result in sudden and unpredictable movement of the membrane 15 and associated changed in phase of the light reflected back from the membrane relative to the reference phase.

Figure 6:
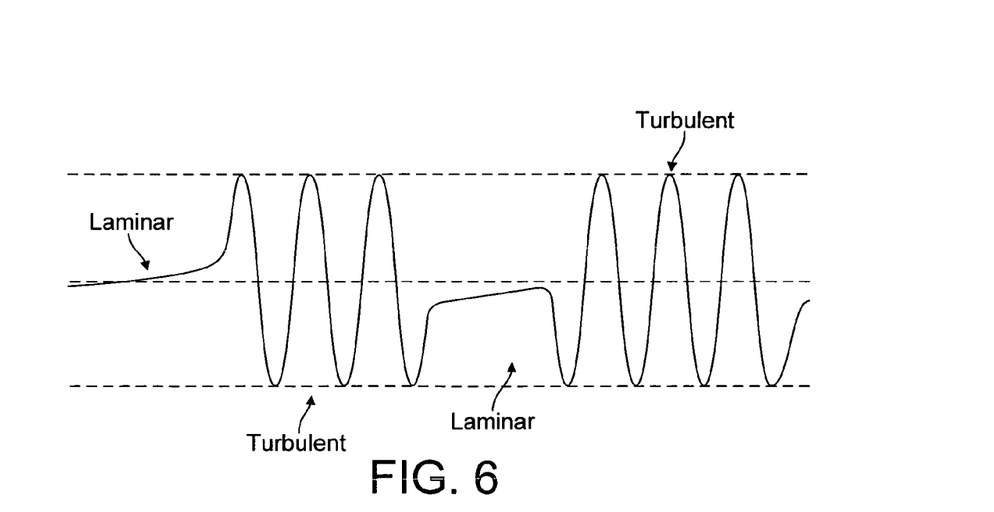
FIG. 6 is an illustration of an example intensity pattern developed from the sensor signals.

FIG. 6 is a line graph schematically illustrating a sensor signal developed by the processor 47 over time, based upon the interference between the reference and sensor light signals. Beginning at the left of the diagram, the flat region of the graph corresponds to periods in which the membrane is not moving. The phase difference between the sensor signal and the reference signal is therefore constant, and the line graph is flat. Gentle movement of the membrane under the influence of external atmospheric pressure will be reflected by small changes in phase and associated changes in the intensity of the resulting light signal due to the interference.

If the membrane moves further, then the phase between the reference signal and the sensor signal will change and result in further changes in intensity. If the magnitude of the movement of the membrane is sufficiently large, a sinusoidal variation in the intensity of the light will be seen as the phase difference increases through complete phase oscillations. The sinusoidal variation will continue for the period in which the membrane is moving, and will reverse direction as the direction of movement of the membrane reverses. The time taken for the intensity to vary from peak to peak additionally indicates the time taken for the membrane to move half of the distance indicated by the wavelength of the light signal.

The intensity graph of FIG. 6 which is developed by the processor can therefore be used to give an indication of the air flow conditions across the surface of the blade. Turbulent air flow will result in buffeting of the blade and the sensor membrane, and the corresponding graph of intensity will indicate frequent and chaotic movements of the membrane. This will be characterised by many occurrences of sinusoidal variation of the signal, and relatively few periods where the intensity is essentially unchanging or is changing slowly. Further the sinusoidal variations themselves are likely to have higher frequencies of oscillation, indicating faster movement of the membrane than at other times.

Laminar air flow or non-turbulent background conditions, on the other hand, will result in little or less movement of the membrane. The intensity graph would therefore be characterised by more and longer periods of flat lines, gentle variations, or periods in which although a sinusoidal variation is seen, it has a long wavelength indicating that it is occurring relatively slowly.

The flat line regions of the graph representing no movement of the membrane may or may not always indicate the same intensity of light. In practice, although the rest position of the membrane may be largely determined at least in part by the membrane tension and the material of which the membrane is made, the instantaneous force exerted by the air flow will ultimately determine the instantaneous position.

The processor 47 analyses the intensity of the light signals received at ADC 46, to determine the present quality of air flow across the blade. It may do this using suitable mathematical processing techniques to determine the amount of variation in the light signal, such as that shown in FIG. 5. In other embodiments, it may use neural network techniques to develop a memory of the visual appearance of the intensity patterns for turbulent and laminar air flow, and determine the current air flow conditions by comparison with pre-developed model patterns. Such patterns may be stored in memory 49.

As well identifying whether the results from an individual sensor 44 indicate turbulence, the processor 47 has the further function of assessing the current operating performance of the wind turbine blades based on the results collected from the plurality of sensors 44 over time. It will be appreciated that a separate processor could be provided for this purpose, but that for the sake of simplicity in the present description, processor 47 will be assumed to perform both roles.

Figure 7:
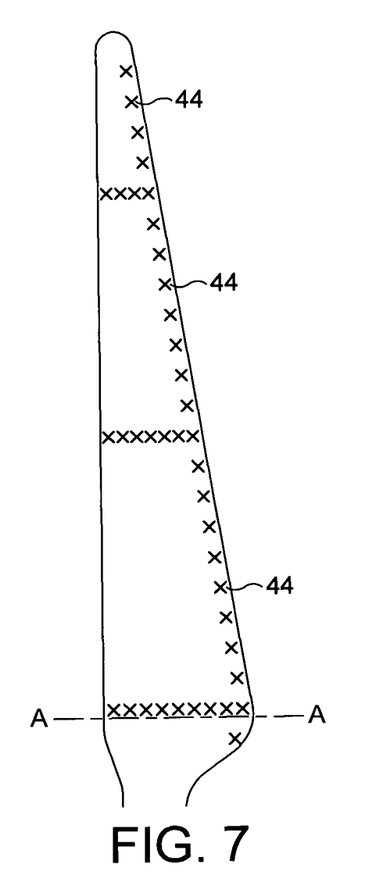
FIG. 7 is a longitudinal elevation of a wind turbine blade showing an example arrangement of the turbulence sensors in a pitch control system.
Figure 8:
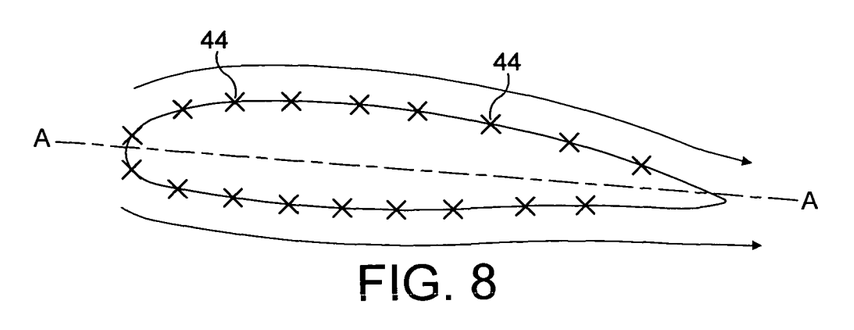
FIG. 8 is cross-sectional view through the line A-A in FIG. 7 in non-stall-like conditions.

Referring to FIG. 7, the pitch control system provided an example of the present invention will now be described. FIG. 7 shows a view of the leeward side of a wind turbine blade. Turbulence sensors 44 as described above are disposed across the surface of the blade at a plurality of locations. Although it is possible in some embodiments that the sensors will be provided at equally spaced locations across the blade surface, in practice it is sufficient if they are at disposed to give at least some coverage in the longitudinal and lateral directions. As shown in FIG. 7 therefore the sensors are provided in at least one linear array along the trailing edge of the blade, and in a number of lateral linear arrays disposed along the length of the blade. FIG. 8 illustrates a cross sectional view through one of the lateral linear arrays showing sensors located on both the windward and leeward sides.

The sensors are shown as being generally equally spaced, as this will allow data about the flow of air around the entire blade surface to be collected. It will however be appreciated that for detecting stall-like conditions, the area of most interest is the leeward trailing side of the blade. More sensors may be mounted in that region for this reason.

Figure 9:
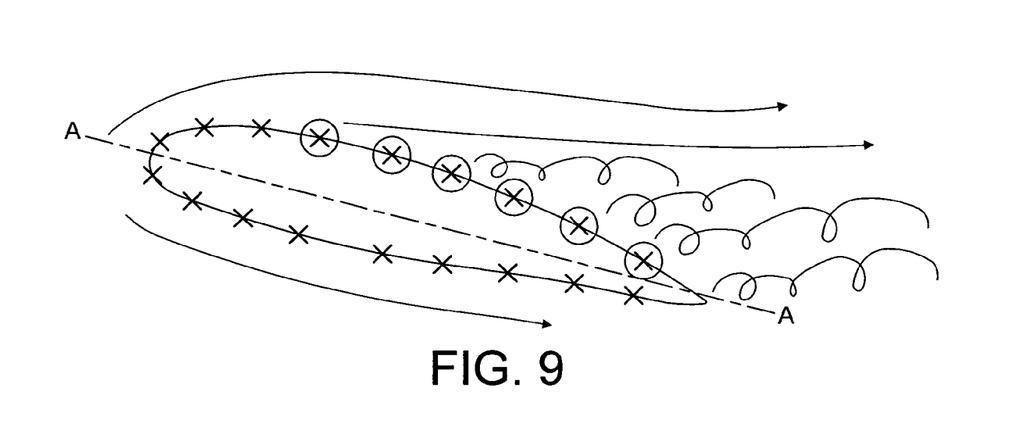
FIG. 9 is a cross-sectional view through the line A-A in FIG. 7 in stall-like conditions.
Figure 10:
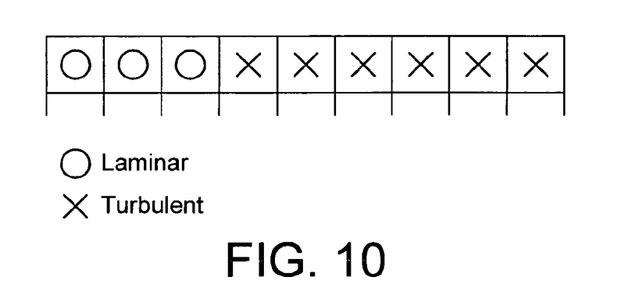
FIG. 10 is a schematic illustration of a sensor results table used in a control and alarm system.

FIG. 8 shows a wind turbine blade in conditions representing essentially laminar air flow, while FIG. 9 shows the blade profile of FIG. 8 in stall-like conditions. The shaded area shown above and behind the blade is an area of non-laminar, turbulent air resulting from the greater than optimal pitch of the wind turbine blade into the air flow. The processed sensor output of the sensors on the leeward (top) side of the blade is shown in FIG. 10. Sensors indicating turbulence are denoted by crosses in the table.

The processor 47 communicates with the pitch control unit 50 of the wind turbine control system and indicates a pitch control instructions based upon the number of sensors 44 indicating turbulent air flow. The pitch control system 50 also receives an input from a power monitor (not shown) that measures the output power being generated by the turbine. In normal use, the pitch controller increases the pitch at which the blades are angled into the wind in order to maximise the output power, and avoid making the pitch too large and inducing a stall condition.

Blade pitch control based solely on the output power can be slow in responding to changes in wind speed and direction. The input from processor 47 however provides a finer, more responsive level of control based on the immediate wind condition at the blade. Thus, where the number of sensors indicating turbulence exceeds a predetermined value, and continues to do so for a predetermined period of time, the processor 47 instructs the pitch controller 50 to reduce the pitch until the number of turbulence sensors which indicate turbulence falls below the predetermined number. In this way, the pitch of the blade can be controlled in real time and be responsive to the measured turbulence of the air flow across the blade.

In further examples, the data from the plurality of sensors mounted on the blade surface can be used to monitor the performance of a wind turbine blade in real time from the perspective of the blades aerodynamic design. By transmitting data from different turbines to a central store for analysis, sufficient data could be collected about the air flow performance of the wind turbine blades, allowing them to be improved in future re-designs.

In alternative applications, the turbulence sensor described above can be applied to the control of further wind turbine rotor blade aerodynamic parameters such as rotor blade shape and rotor blade air flow. This will now be briefly described.

The shape of a rotor blade can be dynamically adjusted using a variety of techniques. To some extent these will change the air flow properties across the blade and by directly affecting the lift experienced by the blade will also affect the power generated. Such techniques can be used with both pitch control and stall control wind turbines as desired. A number of techniques are discussed below:

1) Flaps and ailerons are hinged regions of the blade that can be adjusted as required to change the flow of air over the blade surface. Although, these are typically located at the trailing edge of the turbine blade, they could also be located on other parts of the blade as required. Their effect in this case would be more like that of a spoiler acting to reduce lift.

2) Micro tabs are actuable elements located in the blade or on the surface that can be rapidly extended into the air flow to change its dynamic properties. They can be used to reduce stress on the blade, dampen vibrations as well as increasing lift.

3) Slots and slats in the blade can be used in the same way as 1) and 2) above. In other designs, concave or convex bumps on the blade surface can also be activated to change air flow.

4) Fluid filled cavities or voids inside the blade can be used to change the shape of the blade as they are filled with fluid or evacuated. In some designs, air can be sucked into the blade or expelled from it to change the air flow. Variable vortex generators in the blade fall into this category.

5) Deformation of the blade shape or variation in the blade span can also be achieved by control of the underlying structural supports.

The optical turbulence sensor described above can be used with any of the control mechanisms described above.

The sensor described above is relatively inexpensive to produce and is easy to mount. Thus, sensor systems comprising a large number of sensors can be installed relatively easily into both new and existing turbines. Furthermore, the membrane may be painted the same colour as the surrounding component surface to ensure that the visual appearance of the wind turbine is not impaired.

The above examples of the invention relate to control of the wind turbine blade aerodynamic properties. It will be appreciated that the sensor system could also be used to detect the accummulation of ice or other accumulated material on the surface of the blade. In this case, sensors would be located across the blade surface at a plurality of locations. As ice, for example, tends to accummulate at the leading edge of the wind turbine blade, more sensors can be located along the leading edge than elsewhere. This is contrary to the illustrative sensor arrangement shown in FIG. 7. It would not be problematic to have a sensor membrane that followed the curve of the leading edge. As ice built up over the turbulence sensors located at the leading edge, the sensor membrane would no longer be able to vibrate under the influence of the passing air, and the sensor signal produced from that sensor would therefore appear to be cut-off or unvarying. The processor could therefore monitor changes in the sensor output for such changes and use this to identify a likely ice accummulation condition. Furthermore, as ice build-up at the leading edge would affect the aerodynamic shape of the blade, and likely to lead to increased turbulence towards the trailing edge, it can be possible to identify ice accumulation from the different responses of sensors at different locations.

The above description is intended only to be illustrative of the invention defined by the claims. Alternative techniques for implementing the invention will occur to the skilled person in the art. In one alternative embodiment, the ADC 46 and the turbulence detection part of the processor may be replaced by an analogue filter that passes the high frequencies associated with rapid deflection of the membrane 15, and a circuit that activates an output if the amount of signal within these frequencies exceeds a certain limit or rate of occurrence.

As rotor blades are susceptible to lightning strikes, the preferred device employs optical fibres as both light source and light detector in the sensor housing. In alternative embodiments however, opto-electronic devices such as light emitting diodes and photo detectors may be used directly inside the sensor housing, with appropriate electrical and signalling connections to a controller and power source. In certain embodiments it may of course be appropriate to install the control electronics and power systems locally or in the sensor itself.

The invention claimed is:

1. A control system for at least one rotor blade of a wind turbine, comprising:
   a plurality of sensors configured to provide data of turbulence in airflow moving past a rotor blade surface of the at least one rotor blade; and
   a controller for receiving the data from the plurality of sensors, and based on a detection of the turbulence in the airflow controlling an aerodynamic parameter of the at least one rotor blade, wherein each of the plurality of sensors comprises:
   a sensor membrane comprising a first surface and an opposing second surface, the first surface being disposed in an external environment and the second surface disposed in a cavity in the at least one rotor blade, the sensor membrane configured to detect the turbulence of the airflow moving past the rotor blade surface of the at least one rotor blade, wherein the sensor membrane is integral to the rotor blade surface and covers at least part of the cavity in the at least one rotor blade;
   a light source located in the cavity for illuminating the second surface of the sensor membrane disposed inside the cavity; and
   a light detector located in the cavity and configured to detect the light reflected from the second surface of the sensor membrane, and the light detector is configured to provide an output to a processor, wherein the processor is configured to determine from the output from the light detector a turbulence value for the airflow.

2. The control system of claim 1, wherein the aerodynamic parameter is a pitch angle of the at least one rotor blade.

3. The control system of claim 2, further comprising:
   a power sensor for detecting an output power of the wind turbine and outputting a signal to the controller,
   wherein the controller additionally controls a pitch of the at least one rotor blade based on the detection of the output power of the wind turbine.

4. The control system of claim 3, wherein the controller controls the pitch of the at least one rotor blade to minimize the turbulence value, and maximise maximize the wind turbine output power of the wind turbine.

5. The control system of claim 1, wherein the controller reduces a pitch of the at least one rotor blade into a wind, when a predetermined number of the plurality of sensors indicate turbulence in the airflow.

6. The control system of claim 1, wherein the aerodynamic parameter is a shape of the at least one rotor blade.

7. The control system of claim 1, wherein the aerodynamic parameter is the airflow moving past the rotor blade surface of the at least one rotor blade.

8. The control system of claim 1, wherein the plurality of sensors are located on a suction surface of the at least one rotor blade.

9. The control system of claim 8 wherein the plurality of sensors are located in greater numbers towards a trailing edge of the suction side of the at least one rotor blade, than in other areas.

10. The control system of claim 1, wherein the light source and the light detector disposed in the cavity include optical fibres connected to an opto-electrical light source.

11. The control system of claim 1, further comprising an adder for adding the output associated with the light reflected from the second surface of the sensor membrane to a reference light signal to create an interference pattern indicating displacement of the sensor membrane.

12. The control system of claim 11, wherein the adder comprises a partial mirror located in the sensor cavity, the partial mirror configured to reflect a portion of the light from the light source to the light detector and to provide the reference light signal.

13. The control system of claim 1, wherein the cavity is sealed.

14. The control system of claim 13, wherein the cavity is filled with a gas other than air.

15. The control system of claim 1, wherein the sensor membrane is formed of a different material compared to a material from which the rotor blade surface is formed.

16. The control system of claim 11, further comprising a processor for analyzing sinusoidal variations in the interference pattern over a predetermined period of time to determine whether the airflow is turbulent.

17. The control system of claim 1, comprising a memory for storing data from the plurality of sensors and generating a log of airflow conditions over the rotor blade surface.

18. A wind turbine comprising the control system of claim 1.

19. A computer-implemented method for controlling at least one rotor blade of a wind turbine, comprising:
   receiving data from a plurality of sensors detecting turbulence in airflow moving past a rotor blade surface of the at least one rotor blade; and
   controlling, based on the data from the plurality of sensors, an aerodynamic parameter of the at least one rotor blade, wherein each of the plurality of sensors comprises:
   a sensor membrane comprising a first surface and an opposing second surface, the first surface being disposed in an external environment and the second surface disposed in a cavity in the at least one rotor blade, the sensor membrane configured to detect the turbulence of the airflow moving past the rotor blade surface of the at least one rotor blade, wherein the sensor membrane is integral to the rotor blade surface and covers at least part of the cavity in the at least one rotor blade;
   a light source located in the cavity for illuminating the second surface of the sensor membrane disposed inside the cavity;
   a light detector located in the cavity and configured to detect the light reflected from the second surface of the sensor membrane, and the light detector is configured to provide an output to a processor, wherein the processor is configured to determine from the output from the light detector a turbulence value for the airflow.

20. The method of claim 19, further comprising controlling an output of the light source, and analyzing the output of the light detector.

21. The method of claim 19, further comprising:
   detecting an output power of the wind turbine and outputting a signal, wherein the controlling the aerodynamic parameter further comprises controlling a pitch of the at least one rotor blade based on the detection of the output power of the wind turbine.

22. The method of claim 19, wherein the controlling the aerodynamic parameter further comprises controlling a pitch of the at least one rotor blade to minimize the turbulence value, and maximize the output power of the wind turbine.

23. A computer program product comprising a non-transitory computer readable medium on which computer code is stored, wherein when the computer code is executed by a processor, the processor is caused to perform operations of:
   receiving data from a plurality of sensors detecting turbulence in airflow moving past across a rotor blade surface of the at least one rotor blade; and controlling, based on the data from the plurality of sensors, an aerodynamic parameter of the at least one rotor blade, wherein each of the plurality of sensors comprises:
- a sensor membrane comprising a first surface and an opposing second surface, the first surface being disposed in an external environment and the second surface disposed in a cavity in the at least one rotor blade, the sensor membrane configured to detect the turbulence of the airflow moving past the rotor blade surface of the at least one rotor blade, wherein the sensor membrane is integral to the rotor blade surface and covers at least part of the cavity in the at least one rotor blade;
- a light source located in the cavity for illuminating the second surface of the sensor membrane disposed inside the cavity;
- a light detector located in the cavity and configured to detect the light reflected from the second surface of the sensor membrane, and the light detector is configured to provide an output to a processor, wherein the processor is configured to determine from the output from the light detector a turbulence value for the airflow.

24. The computer program product of claim 23, wherein when the computer code is executed by a processor, the processor is caused to perform the operation of controlling an output of the light source, and analyzing the output of the light detector.

25. The computer program product of claim 23, wherein when the computer code is executed by a processor, the processor is further caused to: detect an output power of the wind turbine and output a signal, wherein the controlling the aerodynamic parameter further comprises controlling a pitch of the at least one rotor blade based on the detection of the output power of the wind turbine.

26. The computer program product of claim 23, wherein the controlling the aerodynamic parameter further comprises controlling a pitch of the at least one rotor blade to minimize the turbulence value, and maximize the output power of the wind turbine.

* * * * *